United States Patent [19]

Hamilton et al.

[11] Patent Number: 4,990,356

[45] Date of Patent: * Feb. 5, 1991

[54] FOOD COMPOSITION

[76] Inventors: Robert G. Hamilton, 14 Bonniebrae St., Wynnum West, Queensland; Frank J. Van Doore, 148 Windsor Road, Kelvin Grove, Queensland 4059, both of Australia

[ * ] Notice: The portion of the term of this patent subsequent to Dec. 12, 2006 has been disclaimed.

[21] Appl. No.: 359,345

[22] Filed: May 31, 1989

Related U.S. Application Data

[63] Continuation-in-part of Ser. No. 905,649, Sep. 11, 1986, Pat. No. 4,842,885.

[30] Foreign Application Priority Data

Apr. 22, 1986 [AU] Australia .............................. PH5570

[51] Int. Cl.$^5$ ............................................... A23K 1/10

[52] U.S. Cl. ..................................... 426/623; 426/520; 426/521; 426/646; 426/657; 426/805

[58] Field of Search .............. 426/623, 635, 641, 646, 426/657, 805, 74, 520, 521

[56] References Cited

U.S. PATENT DOCUMENTS 3,115,409  12/1963  Hallinan et al. .................... 426/641
3,202,514   8/1965  Burgess et al. ....................... 426/74

Primary Examiner—R. B. Penland
Attorney, Agent, or Firm—Birch, Stewart, Kolasch & Birch

[57] ABSTRACT

An intermediate moisture food composition including
(a) a source of protein in an amount effective to provide a minimum protein content approximately 15% by weight including hash and/or bone-in fractions
(b) at least one humectant in an amount effective to provide maximum water activity of approximately 0.9.

12 Claims, No Drawings

FOOD COMPOSITION

This application is a continuation-in-part of application Ser. No. 06/905,649, filed on Sept. 11, 1986, now U.S. Pat. No. 4,842,885.

BACKGROUND OF THE INVENTION

1. Field of the Invention

The present invention relates to an intermediate moisture stable food composition, in particular an intermediate moisture stable food composition which is useful as a component in the preparation of pet food. Numerous pet food types and formulations are known in the prior art. Some 70% of the market is retained by canned pet food with dry pet food making up most of the remainder of the market share. A small market has been created for semi-moist or intermediate moisture pet foods but such products have suffered from mediocre consumer acceptance. It would appear that such products have not been successful, inter alia due to their high cost and high sugar levels.

2. Discussion of Related Art

Attempts have been made in the prior art to reduce the cost of intermediate moisture pet foods by including meat meal and bone meal therein. However, meat and bone meal lack the texture, water holding capacity and cohesive strength necessary for this type of product.

SUMMARY OF THE INVENTION

It is accordingly an object of the present invention to overcome, or at least alleviate, one or more of the difficulties related to the prior art.

Accordingly, the present invention provides in a first aspect an intermediate moisture food composition including (a) a source of protein in an amount effective to provide a minimum protein content approximately 15% by weight including hash and/or bone-in fractions (b) at least one humectant in an amount effective to provide maximum water activity of approximately 0.9. Preferably the water activity is from approximately 0.8 to 0.9.

DETAILED DESCRIPTION OF THE INVENTION

More preferably the source of protein is present in an amount of from approximately 15% by weight to 95% by weight based on the total weight of the food composition; and wherein at least one humectant is present in amounts of from approximately 5% to 15% by weight based on the total weight of the food composition.

The product so formed may comprise a component in the preparation of a pet food. It is a stable product and may be stored indefinitely without substantial deterioration. It is not necessary to chill or freeze the product to maintain stability. Thus in times of glut this component product may be pumped into silos and storage vats and stored without the necessity to complete the manufacturing process.

The intermediate moisture food composition may, when required, be utilized as, or as part of, a pet food. The intermediate moisture food composition may be utilized as a dog food.

In a preferred form the source of protein includes from approximately 35 to 95% by weight of a first protein source selected from heat sterilized hash and/or heat treated bone-in fractions and approximately 5% to 65% by weight of a second protein source selected from meat and meat by-products, cereals, milk products and mixtures thereof.

Hash and/or bone-in fractions are wet protein products of low temperature wet rendering of meat by-products. When made from edible bones, the product is termed bone-in fractions. When the product is made utilizing non-edible offals, heads and feet etc., it is referred to as hash. A heat-sterilized hash is preferred. Such heat treatment hydrolyzes the proteins of hair and wool and renders the material sterile. In addition to meat protein, hash provides fat, minerals, cohesion, water binding texture and color to the food composition. In addition hash has a taste and aroma which are very appealing to dogs. The bone-in fractions may also be heat treated as this renders the bone-in fractions easier to mince and produces a superior pet food.

The intermediate moisture food composition according to the present invention may provide one or more advantages in relation to organoleptic quality, preservative effect, product texture and moisture content. The use of hash and/or bone-in fractions as the major protein source provides a reduction in cost. The amino acid profile of the hash and/or bone-in fraction proteins is suitable for use as a pet food.

The second protein source may be selected from meat and meat by-products such as lung, tripe, liver, heart and spleen, meat and bone meals; cereals; milk products including skim milk; or mixtures thereof. Cereals are preferred as they provide an improved amino acid profile in combination with the hash and/or bone-in products. The cereals may be selected from wheat, corn, soy products and the like. What gluten may be used.

What gluten is preferred as it provides a strong matrix which binds the ingredients of the intermediate moisture food composition together. It sets to a resilient mass and provides a texture which is acceptable as a pet food.

The hash and/or bone-in fractions may comprise from approximately 35 to 95% by weight based on the total weight of protein source ingredients. Wheat gluten may be present in amounts of from 0 to approximately 15% by weight based on total weight of the protein source ingredients. Bone and/or meat meal may be present in amounts of from 0 to approximately 15% by weight based on the total weight of the protein source ingredients.

The protein source ingredients may comprise from approximately 30 to 70% by weight based on the total weight of the intermediate moisture food composition according to the present invention. A minimum of approximately 30% by weight of protein source ingredients provides the minimum protein content of approximately 15% required.

In a preferred aspect of the present invention the intermediate moisture food composition has a pH in the range of from approximately 4.0 to 6.0. As the pH may be normally more basic, an acid source may be included. Food approved acids, invert sugar, hydrolysed casein whey and mixtures thereof may be included inter alia to increase acidity to the preferred range.

It is preferred to reduce the pH in particular where the water activity is above approximately 0.85. The reduced pH improves the stability of the food composition where the water activity is relatively high.

Preferably, the intermediate moisture food composition according to the present invention may include a moisture content in the range of approximately 15 to 35% by weight.

A moisture content in the range specified is preferred to provide a shelf stable food product. Such an intermediate moisture food product has improved animal acceptance relative to dry pet foods. Higher moisture content products normally require storage in cans as they will not maintain their shape.

Formulations with a water content in excess of approximately 35% are to be avoided because the necessary amounts of humectants, discussed below, to bring the water activity down to approximately 0.85 would render the food composition unpalatable and more expensive. Water contents below approximately 15% would result in difficulties with product consistency. Moreover, the amount of hash and/or bone-in fractions which could be included in the food composition would be reduced.

As stated above, the intermediate moisture food composition according to the present invention further includes a water activity not greater than approximately 0.85.

Water activity is a measure of the relative humidity of the air above the product at a specified temperature.

In order to provide a water activity below approximately 0.85, the intermediate moisture food composition according to the present invention may further include an effective amount of at least one humectant.

Humectants function to immobilize the water in order to improve shelf stability of the food composition. Unless the water activity is maintained below the level specified, a bacteriologically stable food composition may not be achieved.

Then at least one humectant may be selected from sugars, polyhydric alcohols, lactates (hydrolysed whey) and sodium chloride. Specific examples of humectants include invert sugar, molasses, sucrose, glycerol, propylene glycol, and hydrolyzed casein whey (HCW).

Invert sugar provides acidity and is a preferred humectant as it has a greater water activity lowering effect than does sucrose from which it is made. It is a thick syrup and contributes to the consistency of the products. The inclusion of invert sugar reduces the total quantity of sugar required. Invert sugar may be present in the food composition in amounts from approximately 10 to 15% by weight.

Propylene glycol is also a humectant and may be added primarily to reduce the water activity so as to make the product shelf stable. It is second only to salt in its ability to do this. Being a liquid it has the added bonus of making the product appear moist and succulent. It provides a slight sweet taste. Propylene glycol may be used in any suitable amounts. However amounts up to approximately 3% are preferred because of its high cost and characteristic sweet flavor which is undesirable if used in high concentrations.

Salt may be added as a preservative as it has the greatest ability to reduce the water activity of all the approved humectants. At the concentration preferred, approximately 1–2%, it enhances the meaty taste and masks the sweet taste of the sugars. It is also a very inexpensive ingredient.

Molasses is one of the cheapest sources of sugar and because of this sugar content (60%), it also has some humectant effect. Molasses may be present in the food composition in amounts of from 0 to approximately 4% by weight. It has a pleasant flavor and at the preferred level imparts an appealing taste and light brown color to the products. It is also high in nutritious minerals, e.g., Mg, Fe, Cu, K, Zn, P.

Sucrose may be used in the formulation to increase the binding between raw materials to produce a cohesive, firm product. It is also a humectant and therefore has the ability to lower water activity. Sucrose may be used in amounts of approximately 2 to 4% by weight.

Hydrolyzed casein whey (HCW) is a relatively new dairy by-product which has reasonable humectant properties. It contributes acidity, sugar, lactates, and a dairy taste when used in the formula. HCW may be present in amounts of approximately 2 to 10% by weight.

In a preferred aspect of the present invention the intermediate moisture food composition further includes a maximum fat content of approximately 10% by weight.

The fat content may be provided from a fat source including tallow. At least one other fat source may also be included.

Tallow has several functions in the intermediate moisture food composition. It enhances the flavor and taste appeal, imparts an attractive sheen and lubricates the product, improving its handling, mixing and extrudability. Its major function is, however, as an energy source.

Other fat sources include other animal fats, milk products including skim milk and the like. Tallow may be present in the food composition in amounts of from approximately 5 to 10% by weight.

In a further preferred aspect, the present invention provides an intermediate moisture food composition wherein the components thereof are selected to provide
(a) a minimum protein content of approximately 15% by weight based on the total weight of the food composition; and includes hash and/or bone-in fractions as a protein source,
(b) a moisture content in the range of approximately 15 to 35% by weight based on the total weight of the food composition,
(c) a maximum water activity in the range of approximately 0.8 and 0.9,
(d) a maximum fat content of approximately 10% by weight, and
(e) a pH in the range of approximately 4.0 and 6.0.

In a further aspect of the present invention there is provided a method for preparing an intermediate moisture food composition which method includes
(a) providing a protein source including hash and/or bone-in fractions in an amount effective to provide a minimum protein content of approximately 15% by weight and a humectant in an amount sufficient to provide a water activity no greater than 0.85; and
(b) blending the ingredients for a time sufficient to provide a product of dough-like consistency.

The method according to this aspect of the present invention may include the further step of subjecting the dough-like product to a mincing step.

The method according to this aspect of the present invention may further include the preliminary steps of subjecting the hash and/or bone-in fractions to heat treatment and mincing steps.

Where hash is used as the protein source, a heat sterilized hash is preferred. Where bone-in fractions are used as the protein source, heat treated bone-in fractions are preferred.

Where the protein source is subjected to an initial mincing step, a mincer including a plate including relatively large orifices may be used. A nominal 3 mm plate may be used.

If desired, after the mincing step, the appropriate amount of protein ingredient may be weighed prior to blending.

Where other ingredients including fats and other compounding ingredients are to be included, they may be incorporated at the blending step.

The intermediate moisture food composition may further include other compounding ingredients: colorants, flavorants, anti-mycotic agents, vitamin and mineral supplements and fillers may be included.

Meat meal may be added primarily as a filler. It also helps to improve the protein and fibre content of the product. Mill run, the residue of wheat flour manufacture may also be included as a filler.

Vitamin/mineral premix: Vitamins may be added to the pet food to ensure the product meets the NRC recommendations for a complete pet food.

Flavor: Curry powder may be used. It may be dusted on the exterior of the pet food pieces to attract the animal to try the product.

The present invention will now be more fully described with reference to the accompanying examples. It should be understood, however, that the description following is illustrative only and should not be taken in any way as a restriction on the generality of the invention described above.

EXAMPLE 1

FORMULA BASED ON FRACTIONS/HASH MATERIAL

Variables

Skim milk powder
Wheat gluten
Mill run
Fractions/hash
Hydrolysed casein whey (H.C.W.)
Tallow
Propylene glycol
Glycerol
Invert sugar
Molasses
Meat meal
Salt
Sucrose

Constraints

Fat
Moisture
Water activity
Protein

| FINAL MIX CONSTRAINT FAT - UPPER LIMIT OF 10% CONTRIBUTING INGREDIENTS | | |
|---|---|---|
| Skim milk = 0.9 | Wheat gluten = 1.0 | Mill run = 3.5 |
| Fractions = 6.67 | Tallow = 100 | Meat meal = 7.4 |

| FINAL MIX CONSTRAINT FAT - UPPER LIMIT 30% CONTRIBUTING INGREDIENTS | | |
|---|---|---|
| Skim milk = 4.0 | Wheat gluten = 11.0 | Mill run = 11.0 |
| Fractions = 54.8 | H.C.W. = 44.0 | Invert. = 33.0 |
| Molasses = 25.0 | Meat meal = 10.2 | |

| FINAL MIX CONSTRAINT WATER ACTIVITY - 0.83 FOR 30% MOISTURE CONTRIBUTING INGREDIENTS | | |
|---|---|---|
| H.C.W. = 0.22 | P. glycol = 1.68 | Glycerol = 1.45 |
| Invert. = 0.59 | Molasses = 0.30 | Salt = 5.60 |
| Sucrose = 0.66 | | |

| FINAL MIX CONSTRAINT PROTEIN - LOWER LIMIT OF 19% CONTRIBUTING INGREDIENTS | | |
|---|---|---|
| Skim milk = 37.10 | Wheat gluten 80.0 | Mill run 16.9 |
| Fractions = 22.0 | H.C.W. = 1.34 | Molasses 1.0 |
| Meat meal = 61.42 | | |

| TYPICAL INGREDIENT COSTS - IN CENTS/KG | | |
|---|---|---|
| Skim milk = 130 | Wheat gluten = 125 | Mill run = 12 |
| Fractions = 16.67 | H.C.W. = 22.4 | Tallow = 35 |
| P. glycol = 172 | Glycerol = 247 | Sucrose = 50 |
| Invert. = 40 | Molasses = 6.8 | Meat meal = 11 |
| Salt = 15 | | |

| VARIABLE LIMITS | | |
|---|---|---|
| 0.06 = | wheat gluten = | unbounded |
| 0.00 = | Mill run = | 0.15 |
| 0.35 = | Fractions = | unbounded |
| 0.06 = | Tallow = | 0.06 |
| 0.03 = | P. glycol = | unbounded |
| 0.00 = | Sucrose = | 0.08 |
| 0.00 = | Invert. = | 0.14 |
| 0.00 = | Molasses = | 0.04 |
| 0.00 = | Salt = | 0.02 |

| PREFERRED FOOD COMPOSITION | |
|---|---|
| Ingredient | % of Mix |
| Sucrose | 2.4 |
| Fractions | 37.6 |
| Meat meal | 10.2 |
| Mill run | 15.0 |
| Invert sugar | 13.8 |
| Molasses | 4.0 |
| Wheat gluten | 6.0 |
| Tallow | 6.0 |
| P. glycol | 3.0 |
| Salt | 2.0 |

EXAMPLE 2

VARIABLES

Skim milk powder
Wheat gluten
Mill run (incl. pollard and bran)
Fractions/hash (incl. offals such as livers and hearts)
Hydrolysed casein whey (H.C.W.)
Tallow
Propylene glycol
Glycerol
Bentonite
Molasses
Meat meal
Salt Sugars (incl. sucrose, glucose, fructose)
Acidity regulator (orthophosphoric acid)
Ground wheat
Sodium nitrite/potassium sorbate (permitted additives)

CONSTRAINTS

Fat
Moisture
Water activity
Protein
pH

| FINAL MIX CONSTRAINT FAT - UPPER LIMIT OF 10% CONTRIBUTING INGREDIENTS | | |
|---|---|---|
| Skim milk = 0.9 | Wheat gluten = 1.0 | Mill run = 3.5 |
| Fractions = 6.7 | Tallow = 100 | Meat meal = 10.0 |

| FINAL MIX CONSTRAINT MOISTURE - UPPER LIMIT OF 25% CONTRIBUTING INGREDIENTS | | |
|---|---|---|
| Skim milk = 4.0 | Wheat gluten = 11.0 | Mill run = 11.0 |
| Fractions = 54.8 | H.C.W. = 44.0 | Invert S = 33.0 |
| Molasses = 25.0 | Meat meal = 7.0 | Gnd. wheat = 10.0 |
| Bentonite = 7.0 | | |

| FINAL MIX CONSTRAINT AW - 0.83 FOR 25% MOISTURE CONTRIBUTING INGREDIENTS | | |
|---|---|---|
| H.C.W. = 0.22 | P. glycol = 1.68 | Glycerol = 1.45 |
| Invert. = 0.59 | Molasses = 0.30 | Salt = 5.60 |
| Sucrose = 0.66 | Glucose = 0.80 | Fructose = 0.90 |
| Phos. acid = 0.30 | | |

| FINAL MIX CONSTRAINT PROTEIN - LOWER LIMIT OF 19% CONTRIBUTING INGREDIENTS | | |
|---|---|---|
| Skim milk = 37.10 | Wheat gluten = 80.0 | Mill run = 16.9 |
| Fractions = 22.0 | H.C.W. = 1.34 | Molasses = 1.0 |
| Meat meal = 50.0 | Gnd. wheat = 12.10 | |

| TYPICAL INGREDIENT COST - IN CENTS PER KG | | |
|---|---|---|
| Skim milk = 200 | Wheat gluten = 200 | Mill run = 18 |
| Fractions = 17 | H.C.W. = 25 | Sucrose = 68 |
| Tallow = 39 | P. glycol = 200 | Glycerol = 300 |
| Invert sugar = 65 | Molasses = 13 | Meat meal = 350 |
| Salt = 27 | Bentonite = 14 | Phos. acid = 110 |
| Fructose = 85 | Glucose = 78 | Gnd. wheat = 18 |
| Na nitrite = 100 | K Sorbate = 1120 | |

| VARIABLE LIMITS | | |
|---|---|---|
| LOWER | | UPPER |
| 0.06 | Wheat Gluten | Unbounded |
| 0.00 | Mill run | 0.15 |
| 0.30 | Fractions | Unbounded |
| 0.06 | Tallow | 0.06 |
| Unbounded | P. Glycol | Unbounded |
| 0.00 | Sucrose | 0.09 |
| 0.00 | Invert | 0.14 |
| 0.00 | Molasses | 0.04 |
| 0.00 | Salt | 0.02 |
| 0.00 | Bentonite | 0.04 |
| 0.0005 | Nitrite | 0.0005 |
| 0.003 | Sorbate | 0.003 |

-continued

| VARIABLE LIMITS | | |
|---|---|---|
| LOWER | | UPPER |
| 0.00 | Gnd. wheat | 0.025 |

| PREFERRED FOOD COMPOSITION | |
|---|---|
| INGREDIENTS | % OF MIX |
| Fractions | 30.0 |
| Sugar | 5.0 |
| Tallow | 6.0 |
| P. Glycol | 3.0 |
| Salt | 2.0 |
| Nitrite | 0.05 |
| Sorbate | 0.3 |
| Mill run | 14.65 |
| Wheat gluten | 8.0 |
| Invert Sugar | 6.0 |
| Ground Wheat | 12.8 |
| Meat Meal | 12.2 |
| | 100 |

The hot protein fractions are passed through a mincer bearing a 3 mm plate. The minced protein is then weighed and placed in a standard blender. A weighed quantity of wet ingredients and dry ingredients are then added to the blender and blending continued until the product has a dough-like consistency. The dough-like product is then subjected to a further mincing step which may be through a fine plate mincer. Alternatively, the dough-like product may be extruded through a nozzle coupled to a mincer. The minced product may be cast or otherwise formed into any desired shape. The shaped food pieces may then be dusted with a flavorant such as curry powder if desired.

Finally, it is to be understood that various other modifications and/or alterations may be made without departing from the spirit of the present invention as outlined herein.

What is claimed is:

1. An intermediate moisture stable food composition having a pH of approximately 4 to 6, useful as a component in the preparation of a pet food and adapted to be stored indefinitely without substantial deterioration consisting essentially of:

(a) a source of protein in an amount effective to provide a minimum protein content of 15% by weight which comprises hash and optionally contains bone-in fractions, (b) a moisture content in the range of approximately 15 to 35% by weight based on the total weight of the food composition, and (c) at least one humectant in an amount of approximately 5 to 15% based on the total weight of the food composition and which is effective to provide a maximum water activity of 0.9.

2. The intermediate moisture stable food composition according to claim 1, wherein the water activity is approximately 0.8 to 0.9.

3. The intermediate moisture stable food composition according to claim 2, wherein the source of protein is present in an amount of 15 to 95% by weight based on the total weight of the food composition.

4. The intermediate moisture stable food composition according to claim 3, wherein the source of protein contains approximately 35 to 95% by weight of a first protein source consisting of hash and optionally contains bone-in fractions and approximately 5% to 65% by weight of a second protein source selected from the group consisting of meat, meat by-products, cereals, milk products and mixtures thereof 5. The intermediate moisture stable food composition according to claim 4, wherein the humectant is selected from the group consisting of sodium chloride, sugars, polyhydric alcohols, hydrolyzed wheys and mixtures thereof.

6. The intermediate moisture food composition according to claim 5, wherein the humectant component comprises:

up to 2% by weight salt;
up to 15% by weight invert sugar;
up to 4% by weight molasses;
up to 3% by weight propylene glycol;
up to 4% by weight sucrose; and
up to 10% by weight hydrolyzed casein whey, based on the total weight of the food composition.

7. The intermediate moisture food composition according to claim 1 containing an acid source selected from the group consisting of food approved acids, invert sugar, hydrolyzed casein whey and mixtures thereof.

8. The intermediate moisture food composition according to claim 1 containing:

(d) a fat source in an amount effective to provide a maximum fat content of approximately 10% by weight.

9. The intermediate moisture food composition according to claim 8, wherein the fat source is selected from the group consisting of tallow, other animal fats, milk products and mixtures thereof.

10. The intermediate moisture food composition according to claim 1 containing:

(d) a maximum fat content of 10% by weight and, wherein the maximum water activity of (c) is in the range of 0.8 and 0.9.

11. The intermediate moisture stable food composition according to claim 10, wherein the hash is a heat sterilized hash and the bone-in fractions are heat treated bone-in fractions.

12. The intermediate moisture stable food composition according to claim 1, wherein the hash is a heat sterilized hash and the bone-in fractions are heat treated bone-in fractions.

* * * * *